(12) United States Patent
Giannozzi et al.

(10) Patent No.: US 11,448,230 B2
(45) Date of Patent: Sep. 20, 2022

(54) METHOD FOR MANUFACTURING A TURBOMACHINE COMPONENT

(71) Applicant: Nuovo Pignone Srl, Florence (IT)

(72) Inventors: Massimo Giannozzi, Florence (IT); Iacopo Giovannetti, Florence (IT); Gabriele Masi, Florence (IT)

(73) Assignee: NUOVO PIGNONE TECNOLOGIE S.R.L., Florence (IT)

( * ) Notice: Subject to any disclaimer, the term of this patent is extended or adjusted under 35 U.S.C. 154(b) by 532 days.

(21) Appl. No.: 15/313,184

(22) PCT Filed: May 22, 2015

(86) PCT No.: PCT/EP2015/061421
§ 371 (c)(1),
(2) Date: Nov. 22, 2016

(87) PCT Pub. No.: WO2015/181080
PCT Pub. Date: Dec. 3, 2015

(65) Prior Publication Data
US 2017/0189966 A1  Jul. 6, 2017

(30) Foreign Application Priority Data
May 26, 2014 (IT) .......................... FI2014A000122

(51) Int. Cl.
*F04D 29/28* (2006.01)
*F04D 29/22* (2006.01)
(Continued)

(52) U.S. Cl.
CPC .......... *F04D 29/284* (2013.01); *F01D 5/048* (2013.01); *F04D 29/2222* (2013.01);
(Continued)

(58) Field of Classification Search
CPC ............ F04D 29/2222; F04D 29/2227; F04D 29/284; B22F 3/15–156; B22F 7/062; B21K 3/04; F01D 5/048
See application file for complete search history.

(56) References Cited

U.S. PATENT DOCUMENTS 4,063,939 A    12/1977  Weaver et al.
4,383,809 A *  5/1983  Hoffmuller ........... B22F 3/1291
                                                        419/26
(Continued)

FOREIGN PATENT DOCUMENTS

CN       1800587 A    7/2006
CN     201606118 U   10/2010
(Continued)

OTHER PUBLICATIONS

Das et al., "Direct Selective Laser Sintering and Containerless Hot Isostatic Pressing for High Performance Metal Components", Annual International Solid Freeform Fabrication Symposium, University of Texas at Austin, 1997.
(Continued)

*Primary Examiner* — Alexander B Comley
(74) *Attorney, Agent, or Firm* — Baker Hughes Patent Org; Marc Vivenzio

(57) ABSTRACT

A method for manufacturing a turbomachine component is disclosed, including the steps of producing, by additive manufacturing, a plurality of separate segments of the turbomachine component, having a skin surrounding an empty volume corresponding to a massive part of the turbomachine component; assembling the separate segments of the turbomachine component together forming a semi-finished component, with an empty cavity therein; filling cavity of the
(Continued)

semi-finished component with a bulk flowable material; and densifying and solidifying the bulk flowable material in the cavity.

4 Claims, 4 Drawing Sheets

(51) Int. Cl.
*F01D 5/04* (2006.01)
*B22F 3/15* (2006.01)
*B22F 7/06* (2006.01)

(52) U.S. Cl.
CPC ............ *F04D 29/2227* (2013.01); *B22F 3/15* (2013.01); *B22F 7/062* (2013.01)

(56) References Cited

U.S. PATENT DOCUMENTS

| | | | | |
|---|---|---|---|---|
| 4,428,717 | A * | 1/1984 | Catterfeld | F04D 7/04 29/889.4 |
| 4,445,259 | A * | 5/1984 | Ekbom | B22F 7/08 29/889.21 |
| 5,845,398 | A * | 12/1998 | Maumus | F01D 5/048 29/889.21 |
| 6,482,533 | B2 * | 11/2002 | Van Daam | B22F 5/04 419/49 |
| 8,128,865 | B2 * | 3/2012 | Jahnz | B22F 3/15 419/5 |
| 9,114,488 | B2 * | 8/2015 | Rice | B22F 3/15 |
| 9,903,207 | B2 * | 2/2018 | Tozzi | B23K 15/0006 |
| 2004/0223847 | A1 * | 11/2004 | Cvjeticanin | B29C 66/547 415/206 |
| 2005/0135958 | A1 * | 6/2005 | Thorne | B22F 3/1291 419/8 |
| 2006/0140767 | A1 * | 6/2006 | Garman | B22F 7/06 416/182 |
| 2007/0020134 | A1 | 1/2007 | Pursell | |
| 2007/0199727 | A1 * | 8/2007 | Cvjeticanin | F04D 29/4206 174/50 |
| 2008/0115358 | A1 * | 5/2008 | Rice | B22F 3/15 29/889.21 |
| 2008/0237195 | A1 * | 10/2008 | Iwasa | F04D 29/026 219/61 |
| 2010/0196163 | A1 * | 8/2010 | Yagi | F04D 29/023 416/214 R |
| 2011/0286855 | A1 * | 11/2011 | Cappuccini | F01D 5/34 416/241 R |
| 2011/0311389 | A1 | 12/2011 | Ryan et al. | |
| 2011/0318183 | A1 * | 12/2011 | Noronha | F01D 5/048 416/189 |
| 2012/0141261 | A1 * | 6/2012 | Giovannetti | F04D 29/2227 415/203 |
| 2013/0001837 | A1 * | 1/2013 | Gohler | B22F 3/1055 264/497 |
| 2014/0065343 | A1 | 3/2014 | Hess et al. | |
| 2015/0017013 | A1 * | 1/2015 | Tozzi | F04D 29/023 416/227 R |

FOREIGN PATENT DOCUMENTS

| | | |
|---|---|---|
| CN | 102251984 A | 11/2011 |
| JP | 5841635 A | 3/1983 |
| JP | 0112095 Y2 | 4/1989 |
| JP | 2015510979 A | 4/2015 |
| RU | 2386517 C1 | 4/2010 |
| WO | 9719776 A1 | 6/1997 |
| WO | 2013053373 A1 | 4/2013 |
| WO | 2013/124314 A1 | 8/2013 |
| WO | 2014052323 A1 | 4/2014 |

OTHER PUBLICATIONS

Liu et al., "Manufacturing Near Dense Metal Parts Via Indirect Selective Laser Sintering Combined with Isostatic Pressing", Applied Physics A Materials Science Processing Springer Berlin, vol. No. 89, Issue No. 3, pp. 743-748, Jun. 28, 2007.

Italian Search Report and Opinion issued in connection with corresponding IT Application No. FI2014A000122 dated Feb. 9, 2015.

PCT Search Report and Written Opinion issued in connection with corresponding PCT Application No. PCT/EP2015/061421 dated Aug. 10, 2015.

Machine Translation and First Office Action and Search issued in connection with corresponding CN Application No. 201580027760.4 dated Jan. 29, 2018.

Office Action and Search Report issued in connection with corresponding RU Application No. 2016144467 dated Nov. 2, 2018.

* cited by examiner

METHOD FOR MANUFACTURING A TURBOMACHINE COMPONENT

BACKGROUND

Embodiments of the present disclosure concern turbomachine manufacturing. More specifically, the subject matter disclosed herein relates to methods for manufacturing turbomachine components such as in particular, but not exclusively, turbomachine impellers, e.g. impellers for centrifugal pumps and compressors.

Turbomachines comprise one or more rotating components and one or more stationary components. A fluid flowing through the turbomachine is accelerated by the rotary motion of the rotating components and is slowed down in stationary components, where kinetic energy of the fluid is converted into pressure energy.

Centrifugal turbomachines, such as centrifugal pumps and compressors, are usually comprised of one or more impellers mounted for rotation on a rotary shaft. The shaft is supported in a casing. Each impeller is comprised of a disc having a front surface and a back surface and provided with a central hole for mounting on the rotary shaft. Blades extend from the front surface of the disc and define fluid passages therebetween. The impeller can further comprise a shroud, which is connected to the blades and closes the fluid passages on the side opposite the disc.

The fluid passages formed between adjacent blades have usually a complex shape, which is dictated by fluid-dynamic considerations. Each impeller is combined with a diffuser, which receives fluid accelerated from the impeller and wherein kinetic energy of the fluid is converted into pressure energy, thus boosting the fluid pressure. The diffuser is usually formed in a so-called stationary diaphragm housed in the machine casing.

Turbomachine components, which interact with the fluid flow, have often a rather complex shape. This applies both to the stationary components as well as to the rotating components, such as the impellers.

Manufacturing of complex turbomachine components, such as diffusers and impellers, is sometimes performed by numerically controlled chip removal machining. However, machining by chip removal is limited to some kinds of diffuser and impeller, since not every fluid-dynamic surface can be machined by a chip removal tool.

Another option for the manufacturing of turbomachine impellers is by so-called electric discharge machining (EDM), a technique wherein a workpiece in the shape of a disc is placed in a dielectric liquid and co-acts with an electrode. A voltage difference between the workpiece and the electrode is applied, thus generating electric sparks, which erode the surface of the workpiece. The electrode is shaped so that the required cavity is obtained by erosion. Different tools with different electrodes are used in sequence to machine the workpiece until the final impeller shape is obtained.

Also EDM has limitations and drawbacks, in particular due to the need of using several electrodes of different shapes in order to achieve the required final shape of the impeller. The electrodes are subject to wear and must often be replaced. Electric discharge machining is, moreover, a rather slow process.

There is therefore a need for an improved method of manufacturing complex turbomachine components such as in particular, but not limited to, centrifugal impellers for pumps and compressors.

BRIEF DESCRIPTION

According to some embodiments of the subject matter disclosed herein, a method which enables manufacturing of large turbomachine components by additive manufacturing, overcoming the limitations imposed by the structure of the additive manufacturing devices. According to embodiments of the subject matter disclosed herein, a method is provided which comprises a step of producing, by additive manufacturing, a plurality of separate segments of the turbomachine component, at least some of the separate segments having a skin surrounding at least one empty volume corresponding to a massive part of the turbomachine component. The method can further comprise a step of assembling the separate segments of the turbomachine component together forming a semi-finished turbomachine component. The empty volumes of the separate segments thus form at least one inner cavity in the semi-finished turbomachine component. According to some embodiments the inner cavity has an annular extension. According to exemplary embodiments of the method disclosed herein, a step is further provided of filling the at least one inner cavity of the semi-finished turbomachine component with a bulk flowable material.

According to some embodiments, the bulk flowable material can be a liquid or semi-liquid material. In some exemplary embodiments the bulk flowable material can comprise particulate of solid material in suspension in a liquid phase. According to other embodiments of the present disclosure, the bulk flowable material can be in powder form.

According to embodiments disclosed herein, the method can further include a step of sealingly closing the at least one inner cavity filled with bulk flowable material. The bulk flowable material can be densified and converted into solid material, filling the inner cavity and forming an inner core of the turbomachine component.

Exemplary embodiments of the subject matter disclosed herein provide for filling the inner cavity with a powder material and densify the powder material by hot isostatic pressing, i.e. so-called "hipping".

Gaseous matter can be removed from the semi-finished turbomachine component prior to sealing the inner cavity.

In some embodiments, the or each inner cavity of the semi-finished component is provided with two apertures in communication with the exterior of the skin portion, i.e. the solid portion of the semi-finished turbomachine component formed by the assembled segments obtained by additive manufacturing. A double aperture makes filling of the inner cavity with bulk flowable material easier, since the bulk flowable material can be introduced through one aperture and gaseous matter escapes from the other aperture.

The additive manufacturing process step of each segment of the turbomachine component can in turn comprise the following steps: dispensing a layer of a first powder material at a target surface; directing an energy beam at the layer and fuse powder material along a perimeter area surrounding an inner area of non-fused powder material; repeating the dispensing and the directing steps for a plurality of layers, the perimeter area formed in each layer fusing with the perimeter area of the previously formed layers, thus generating the skin portion of the segment of the component; and cooling the segment of the component and removing unfused powder material from the inner volume thereof.

In particular applications the method can be used for manufacturing turbomachine impellers, such as but not limited to centrifugal impellers for turbo-pumps and turbo-compressors or other turbomachines. The method can be used also for manufacturing components of centripetal turbomachines, such as impellers for turbo-expanders and turbines. Embodiments of the subject matter disclosed herein concern manufacturing of impellers provided of a disc with a hub and a plurality of blades extending from the disc and forming flow passages between pairs of adjacent blades. In some embodiments, shrouded impellers can be manufactured with the method disclosed herein.

By separately manufacturing turbomachine component segments and assembling the segments to form an intermediate semi-finished turbomachine component, which is then filled with bulk flowable material and subjected to subsequent densifying and solidification, relatively large turbomachine components, such as large centrifugal impellers, can be manufactured, using comparatively small additive manufacturing machines and apparatus.

The powder material used for additive manufacturing of the outer skin portion of each turbomachine component segment is usually a metal powder.

According to some embodiments, the bulk flowable material used for filling the inner cavity of the semi-finished turbomachine component can be a powder material. In embodiments disclosed herein, a metal powder can be used for filling the inner cavity.

The powder material used for filling the inner cavity of the semi-finished turbomachine component can be a metal powder. Use of ceramic materials is not excluded, however.

If reduction of the component weight is desired, e.g. for low-temperature applications, the bulk flowable material can be comprised of a polymer-based material. For instance a thermoplastic polymeric material can be used. In other embodiments thermosetting polymers can also be employed. For instance epoxy resins, polymides, BMI (bis-maleimides) or other polymeric materials are suitable polymeric materials of use in the applications described herein.

According to further embodiments, a bulk flowable composite material comprised of a plastic material and ceramic particles dispersed therein can be used. According to some embodiments, particles of from 10 nm to 250 micrometer size can be used.

In some embodiments the polymer or composite bulk flowable material is injected in powder or liquid through the skin into the inner cavity. Energy is then applied to cause the material to cure thus forming a densified and solidified core. In some embodiments energy is applied in form of heat. Polyimides can be cured at temperatures typically below 500° C. Epoxy resins can be cured at temperatures below 250° C.

According to some embodiments, the separate segments of the turbomachine components are manufactured with a first metal powder, and the at least one inner cavity of the semi-finished turbomachine component is filled with a second metal powder, the second metal powder being different from the first metal powder. For example, the first metal powder has a grain size smaller than the second metal powder. In some embodiments the first metal powder has a grain size between 10 and 48 micrometers. In some embodiments, the second metal powder has a grain size between 50 and 100 micrometers.

According to possible embodiments of the method disclosed herein the first metal powder and the second metal powder have different chemical compositions. For instance the first metal powder can be or comprise a main percentage of a nickel base super-alloy powder or a titanium alloy powder. The second metal powder can be or comprise a main percentage of steel powder. In other embodiments steel can be used for the external skin made by additive manufacturing and lighter materials, such as aluminum alloys can be used for the inner core made by hipping.

According to some embodiments, the method can further comprise the following steps: providing at least two apertures extending through the skin surrounding the at least one inner cavity; filling the at least one inner cavity with metal powder through one of the apertures and removing gaseous matter from the other of the apertures; and sealingly closing the apertures.

In some embodiments, the method further comprises the steps of: providing an empty deadhead at each aperture; and filling the deadheads with metal powder.

The step of sealingly closing the apertures can comprise the step of sealingly closing the deadheads filled with metal powder.

When a turbomachine impeller is manufactured according to the method disclosed herein, an inner cavity can be provided at the impeller hub, which is the most massive portion of the impeller. Additional inner cavities which are filed with powder material or other bulk flowable material and then subject to hipping or densifying and solidification can be provided in the impeller eye.

In some embodiments, single impeller segments manufactured by additive manufacturing can include a hub and disc portion and a blade. If the impeller is a shrouded impeller, each impeller segment can include a portion of the shroud.

The impeller can be comprised of splitters, i.e. shorter blades arranged in the flow passages defined between adjacent blades. Each impeller segment can comprise one or more splitters.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 4A illustrates an enlargement of detail A of FIG. 4 and FIG. 4B illustrates and enlargement of detail B of FIG. 4;

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Here below an exemplary embodiment of the subject matter disclosed herein is described in connection with manufacturing of an impeller for a centrifugal turbomachine, in particular a centrifugal compressor. In other embodiments, the novel features disclosed herein can be applied to manufacturing of other turbomachine components, in particular to relatively large components which cannot be manufactured as a single piece by additive manufacturing.

Figure 1:
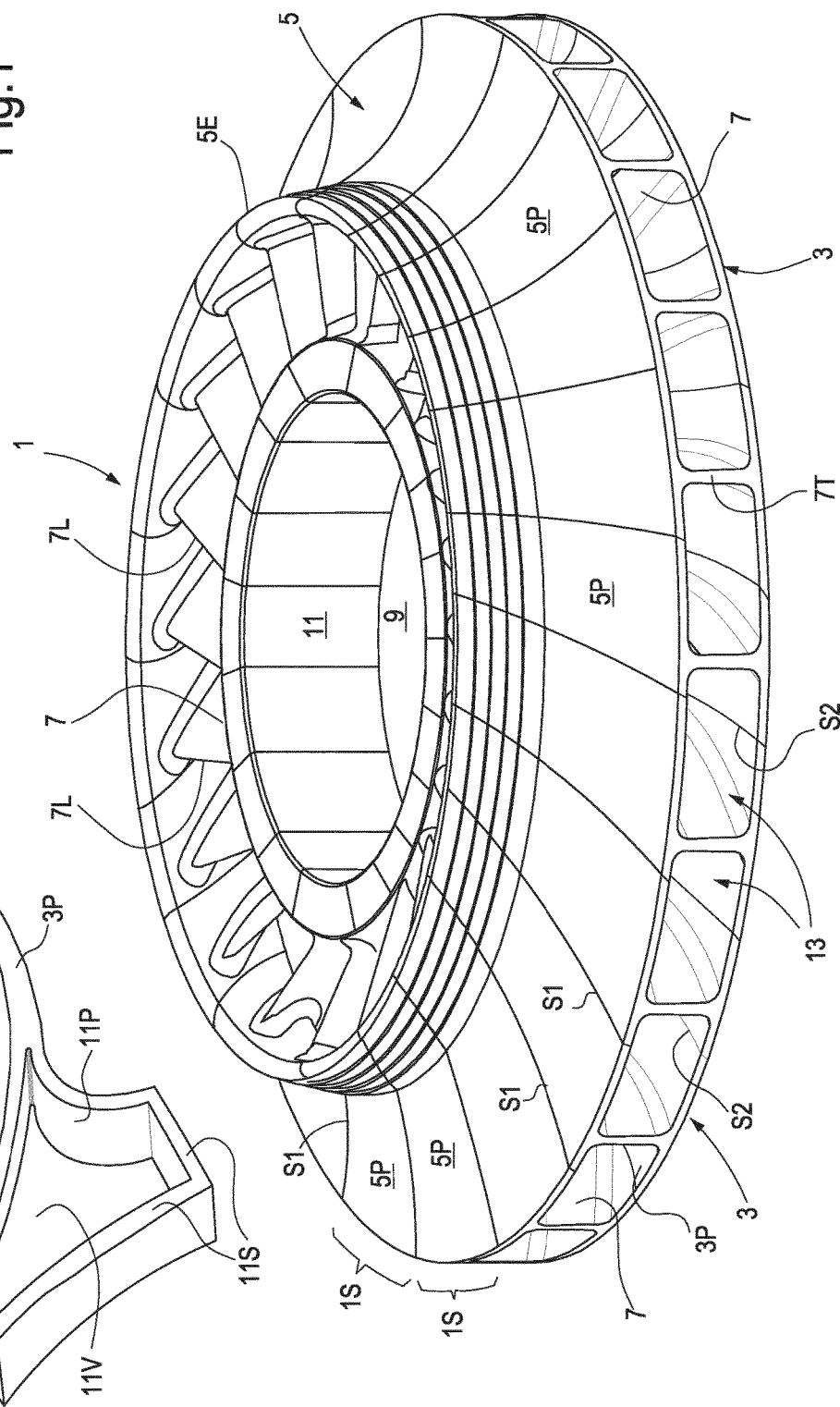
FIG. 1 illustrates an axonometric view of an exemplary embodiment of a centrifugal compressor impeller.

FIG. 1 illustrates an axonometric schematic view of an impeller 1 for a centrifugal compressor. In the embodiment illustrated in FIG. 1, the impeller 1 comprises a disc 3 and a shroud 5. Blades 7 are attached to the front surface of the disc 3 and extend from disc 3 to shroud 5. A central hole 9 is formed in a hub 11, which forms an integral part of the disc 3. Each blade has a leading edge 7L at the impeller inlet and a trailing edge 7T at the impeller outlet.

Flow passages 13 are formed between the impeller disc 3 and the impeller shroud 5 and are separated one from the other by adjacent blades 7.

The shroud 5 forms an impeller eye 5E surrounding the inlet of the impeller 1.

As shown in FIG. 1, the impeller 1 is divided into a plurality of segments or sectors 1S. Each segment 1S can comprise a portion 5P of the shroud 5. Each segment can further comprise a portion 3P of the disc 3 and one blade 7. Lines S1 along the shroud and lines S2 along the disc indicate the interface separating adjacent impeller segments 1S.

Figure 2:
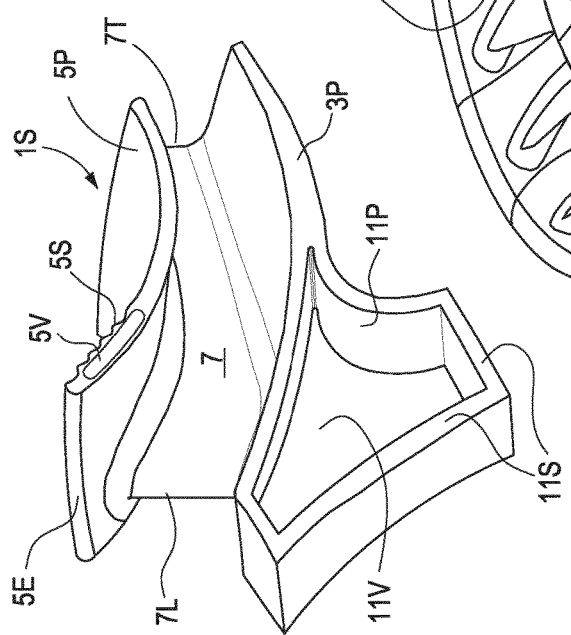
FIG. 2 illustrates a segment of the impeller of FIG. 1.

Each impeller segment 1S can be manufactured by additive manufacturing as described later on referring to FIG. 3. FIG. 2 illustrates a schematic axonometric view of an impeller segment 1S with respective shroud portion 5P, disc portion 3P and blade 7 with respective leading edge 7L and trailing edge 7T. According to FIG. 2, each impeller segment 1S also comprises a portion 11P of the impeller hub 11.

In the embodiment illustrated in FIG. 2, the impeller segment 1S has two massive areas, i.e. areas of a larger cross section, which are empty. More specifically, in the embodiment of FIG. 2 an empty portion or empty volume 11V is provided in the hub portion 11P. A further empty volume 5V is provided at the impeller eye 5E. Both empty volumes 11V and 5V can be surrounded by a respective skin portion 11S and 5S. Those empty volumes 11V and 5V will be filled with metal powder in a subsequent manufacturing step, once the various impeller segments 1S have been assembled to form a semi-finished impeller.

Figure 3:
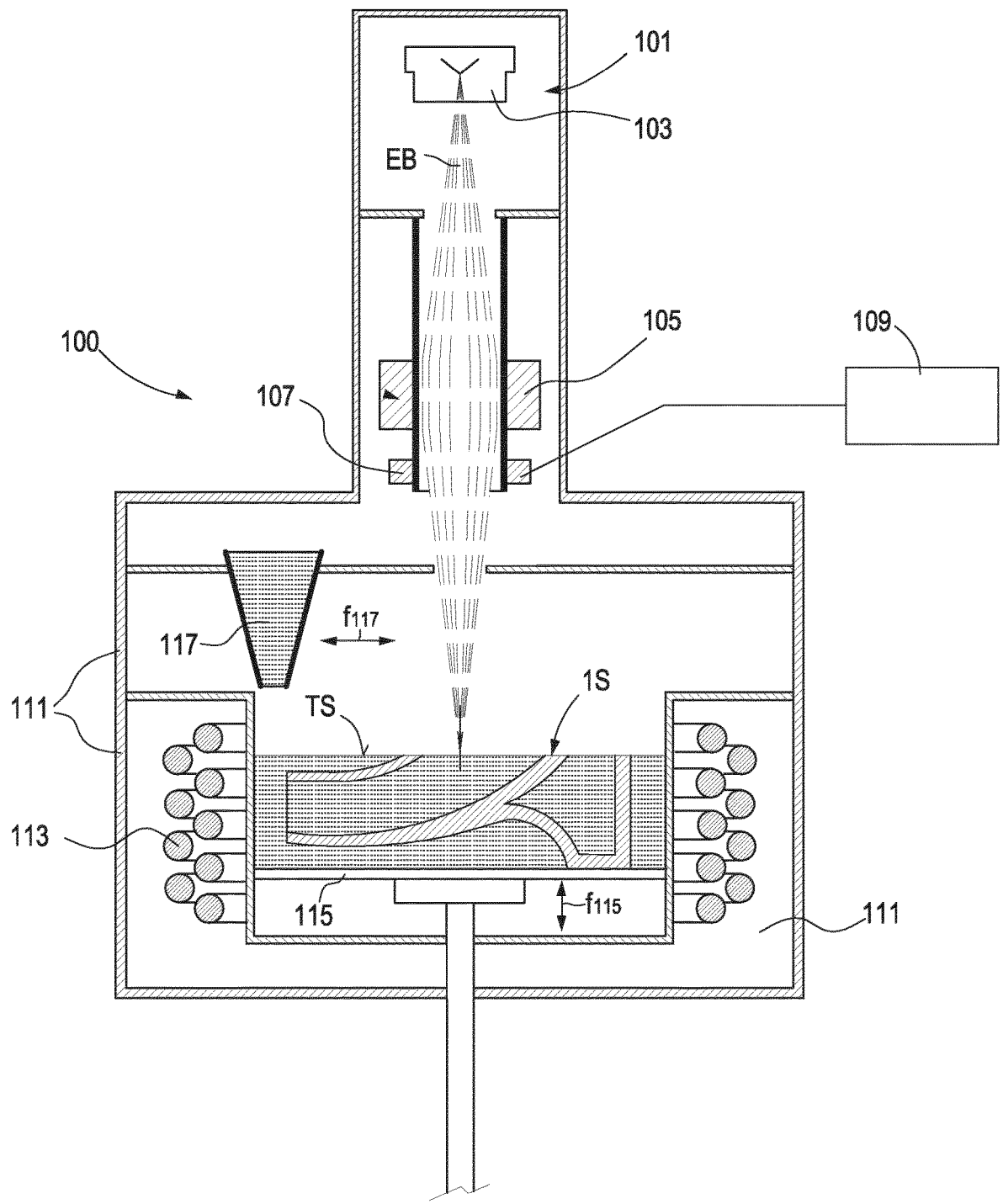
FIG. 3 illustrates a schematic of an additive manufacturing machine.

FIG. 3 is a schematic of an additive manufacturing machine which can be used for manufacturing each separate impeller segment 1S. As known to those skilled in the art, additive manufacturing is a process wherein an article having a complex shape is manufactured layer-by-layer starting from metal powder which is locally melted using a source energy. In the embodiment of FIG. 3, the energy source is an electron beam gun. In other embodiments, the energy source can be a laser.

The additive manufacturing machine of FIG. 3 is designated 100 as a whole. The structure and operation of additive manufacturing machines are known per se and will not be described in great detail herein. In short, the additive manufacturing machine 100 of FIG. 3 includes an energy source, which in the exemplary embodiment disclosed herein includes an electron-beam gun 101 comprising an electron emitter 103 which generates an electron beam EB. The electron beam EB is directed towards a target surface TS, arranged under the electron-beam gun 101. Along the electron-beam path a focusing coil 105 and a deflection coil 107 can be arranged. The focusing coil 105 focuses the electron beam on the target surface TS and the deflection coil 107 controls the movement of the electron beam EB along a pattern according to which a powder material has to be melted and solidified. A computer device 109 controls the deflection coil 107 and the movement of the electron beam EB. The movement of the electron beam EB is controlled by the computer device 109 based on data from a file representing the three-dimensional product to be manufactured.

Under the energy source 101 a confinement structure 111 is arranged. The confinement structure 111 can be combined with a temperature control means, for example comprising a heater shown schematically at 113, e.g. an electrical heater. A movable table 115 can be arranged in the confinement structure 111. The movable table 115 can be controlled to move vertically according to double arrow f115. The vertical movement of the movable table 115 can be controlled by the computer device 109. A powder material container 117 is arranged above the target surface TS and is controlled to move horizontally according to double arrow f117, for example under the control of the computer device 109.

The additive manufacturing process performed by the additive manufacturing machine 100 can be summarized as follows. A first layer of powder material from the powder container 117 is distributed on the movable table 115 by moving the powder material container 117 according to arrow f117 one or more times along the movable table 115 which is placed at the height of the target surface TS. Once the first layer of powder material has been distributed, the electron-beam gun 101 is activated and the electron beam EB is controlled by the deflection coil 107 such as to locally melt the powder material in a restricted portion of the layer, corresponding to a cross-section of the product to be manufactured. After melting, the powder material is allowed to cool and solidify. Powder material outside the boundaries of the cross-section of the product to be manufactured remains in the powder form.

Once the first layer has been processed as described above, the movable table 115 is lowered and a subsequent layer of powder material is distributed on top of the first layer. The second layer of powder material is in turn selectively melted and subsequently allowed to cool and solidify. Melting and solidifying are performed such that each layer portion will adhere to the previously formed layer portion. The process is repeated stepwise, until the entire product is formed, by subsequently adding one powder material layer after the other and selectively melting and solidifying layer portions corresponding to subsequent cross sections of the product.

Once the product has been completed, the powder material which has not been melted and solidified can be removed and recycled.

The above described process can be carried out under controlled temperature conditions by means of the heater 113. The temperature within the confinement structure 111 is controlled such that the entire process is performed at high temperature and virtually no residual stresses remain in the product at the completion of the manufacturing cycle. After the construction process has been completed, the product can be allowed to cool down from a processing temperature to an environment temperature following a cooling curve, which prevents residual stresses in the final product.

In an embodiment, the interior of the confinement structure 111 is maintained under hard vacuum conditions, such that oxygen absorption by the powder material and the melted material is prevented.

In the representation of FIG. 3 an impeller segment 1S is schematically shown in an intermediate step of the above summarized additive manufacturing process.

Once the separate impeller segments 1S of an impeller 1 have been manufactured by additive manufacturing as shortly described above, the plurality of impeller segments 1S are assembled together and connected to one another. According to some embodiments, the impeller segments 1S can be welded, soldered, brazed or connected by means of any other suitable technique. Embodiments provide for welding or brazing the impeller segments to one another. The assembled impeller segments 1S form an intermediate, semi-finished component, i.e. a semi-finished impeller, which is characterized by one or more inner cavities, which correspond to the empty volumes of the assembled impeller segments 1S. If the impeller segments 1S are provided with empty volumes 11V at each hub portion 11P, the semi-finished component will be comprised of an annular inner empty cavity surrounding the rotation axis A-A of the impeller 1 within the hub portion of the impeller 1. In the embodiment illustrated in FIG. 2, each impeller segment 1S also has an empty volume 5V at the impeller eye 5E and therefore the semi-finished component will also have an inner empty cavity annularly developing around the rotation axis A-A at the impeller eye 5E.

Figure 4:
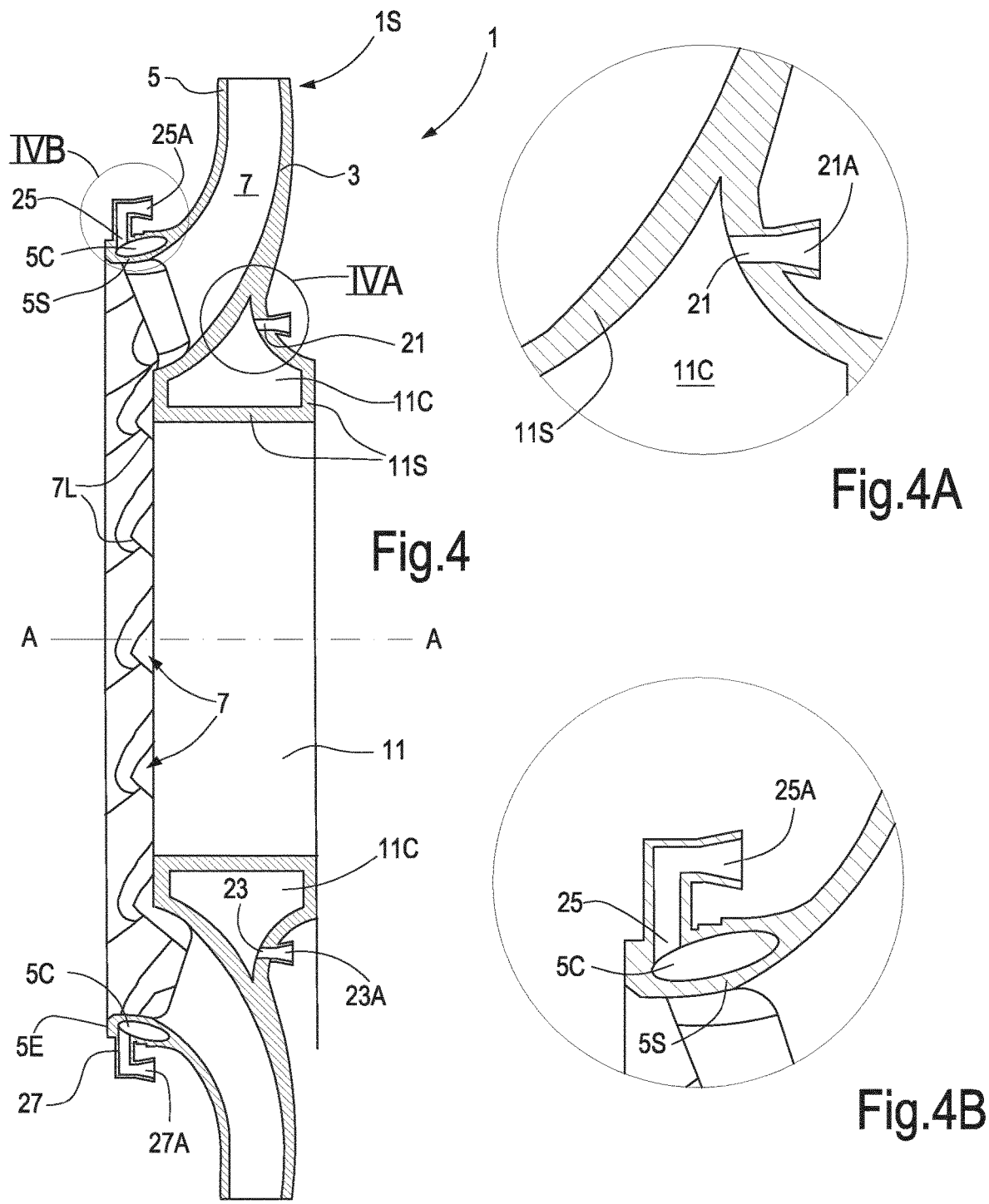
FIG. 4 illustrates a sectional view of the impeller of FIG. 1 during an intermediate step of the manufacturing process, before filling of the empty inner cavities of the impeller with metal powder.

FIG. 4 illustrates a sectional view of the semi-finished impeller taken along a plane containing the rotation axis A-A of impeller 1. The inner empty cavities formed by the adjoining empty volumes 11V and 5V of the assembled impeller segments 1S are labeled 11C and 5C in FIG. 4.

The next step of the manufacturing process provides for filling the inner empty cavities 11C and 5C with a metal powder which will subsequently be compacted and solidified by means of a hot isostatic pressing.

As best shown in FIG. 4, each inner empty cavity 11C and 5C is surrounded by a respective skin 11S and 5S, which is obtained by welding or otherwise joining the impeller segments 1S generated by the additive manufacturing process described above. Once the impeller segments 1S have been assembled and joined together along lines S1 and S2, each inner empty cavity 11C and 5C thus formed will be completely surrounded and enclosed by its relevant skin portion 11S and 5S.

In order to fill each empty inner cavity 11C and 5C with metal powder, apertures are provided through the respective skin portions 11S and 5S. The apertures connect the empty inner cavities 11C and 5C with the environment. In FIG. 4 and in the enlargement of FIG. 4A, two such apertures 21 and 23 are shown, connecting the inner empty cavity 11C, which forms the central massive portion of the hub 11, with the surrounding environment. In some embodiments, as best shown in the enlargement of FIG. 4A, the aperture 21 is provided with a so called deadhead 21A, forming a metal powder reservoir for the purposes which will become clearer later on. In a similar way, also aperture 23 can be provided with a deadhead 23A.

Filling of the inner empty cavity 11C can be facilitated by gravity and vibrating the impeller 1. The metal powder can be delivered into the inner empty cavity 11C through one of the two apertures 21 and 23, while air or other gaseous matter escapes through the other of the two apertures 21, 23. In some embodiments more than two apertures can be provided, arranged in suitable positions along the annular development of the inner empty cavity 11C.

In some embodiments the impeller segments 1S manufactured by additive manufacturing can be manufactured such that a partition wall is formed between adjoining empty volumes 11V and/or 5V. In this case the inner empty cavity 11C and/or 5C can be subdivided into two or more sub-cavities by intermediate diaphragms. In such case each partition of the inner cavity 11C or 5C is provided with two apertures. In an embodiment, however, the shape of the impeller segments 1S is such that once they are assembled to one another, a single annular inner empty cavity 11C and a single annular inner empty cavity 5C are generated. These two annularly shaped inner empty cavities 11C, 5C can be filled with metal powder by means of two apertures for each cavity.

Filling of the inner empty cavity 5C is by gravity and possibly vibration as disclosed above in connection with empty cavity 11C, whereby air or other gaseous matter can escape from the interior of the inner empty cavity 5C through one or the other of the two apertures 25, 27.

In the embodiment illustrated in the attached drawings, only two inner empty cavities 5C and 11C are provided. However, in other embodiments a different number of cavities can be provided. For example only one inner empty cavity 11C at the impeller hub 11 can be provided, while the impeller eye 5E can be solidly manufactured by additive manufacturing, without cavities. In other embodiments, more than two empty volumes 5V, 11V can be formed by additive manufacturing in each impeller segment 1S, such that more than two inner empty cavities 5C and 11C are left in the semi-finished impeller, after the impeller segments are assembled to one another.

In general terms, empty inner volumes can be left during additive manufacturing in each separate impeller segment 1S, in each massive portion of the impeller segment 1S. Thinner portions of the impeller segment, such as in particular the radially most external portion of the impeller disc 3 and the radially outward portion of the shroud 5 can be entirely formed by additive manufacturing.

Once the inner cavities 5C and 11C of the semi-finished impeller have been entirely filled with metal powder, air or other gaseous matter can be removed from the interstices in the metal powder filling the inner cavities 5C, 11C, so that gaseous matter is entirely or substantially entirely removed from the inner cavities 11C and 5C. This can be accomplished for example by arranging the semi-finished impeller in a vacuum chamber. Once air or other gaseous matter has been evacuated from the inner cavities 11C and 5C, the top end of each deadhead 21A, 23A, 25A, 27A can be sealingly closed, for example by melting the powder by laser cladding process, welding or brazing a metal part on top, applying an adhesive to seal a metal part on top or in any other suitable manner.

The semi-finished component can now be subject to the final manufacturing step which involves hot isostatic pressing, or so-called "hipping", which turns the metal powder in the inner cavities into compact solid matter. In this step the semi-finished impeller 1 is placed in an oven and heated at a suitable temperature, for example ranging between 450 and 1400° C. depending upon the material used. Pressure is applied simultaneously to heat, e.g. by means of a pressurized inert gas fed into the oven. Pressures ranging from 40 MPa to 350 MPa are commonly used, for instance. The simultaneous application of pressure and heat eliminates internal voids and micro-porosity through a combination of plastic deformation, creep and diffusion bonding in the metal powder and at the interface between the metal powder contained in the inner cavities 5C, 11C and the inner surface of the skin portions surrounding the cavities.

A solid, compact metallic mass is formed in each of the inner cavities 11C and 5C, which have been filled with metal powder.

Pressure and heat cause densification of the metal powder and reduction of the volume of the metal powder inside the inner cavities 11C and 5C due to the elimination of the internal voids between metal powder grains. This volume reduction is compensated by the metal powder contained in the deadheads 21A, 23A, 25A and 27A. Metal powder contained in the deadheads flow inside the inner cavities 11C, 5C, so that no deformation of the outer skins 11S and 5S, surrounding the inner cavities 11C and 5C will occur. The outer shape and dimension of the skin generated by additive manufacturing during production of the impeller segments 1S are thus maintained to a high degree.

Figure 5:
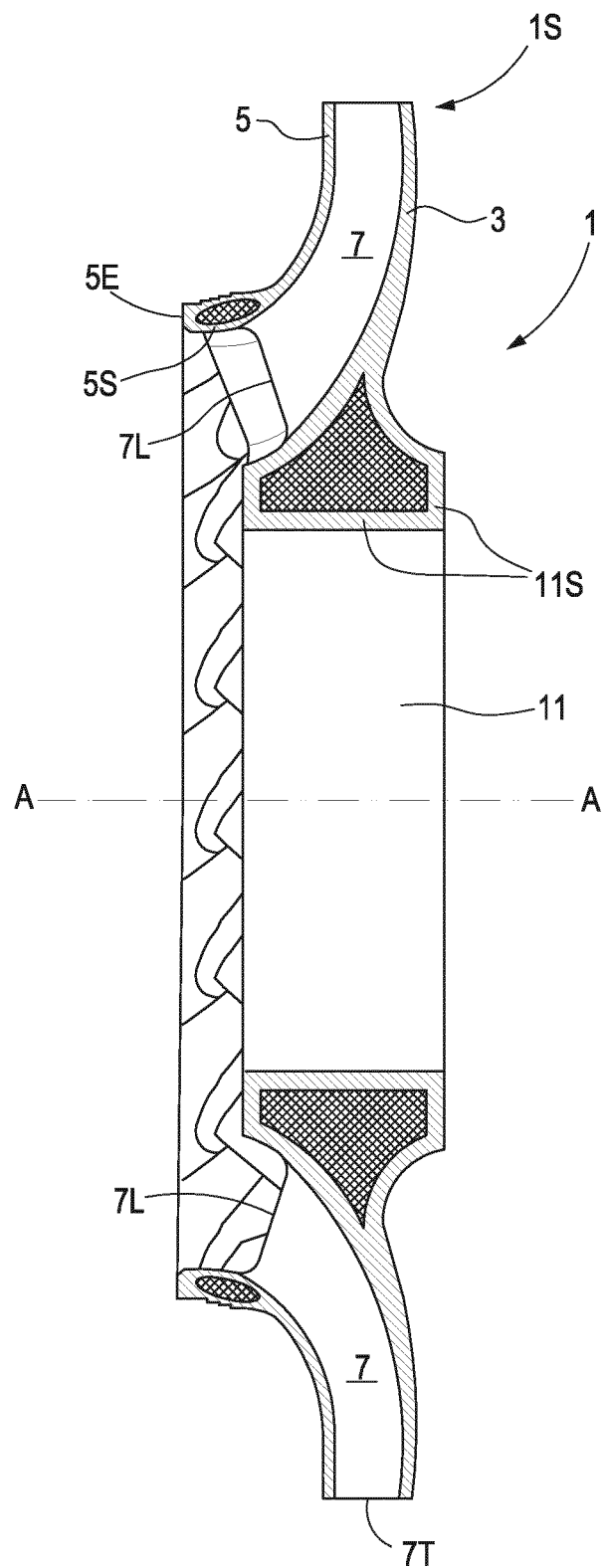
FIG. 5 illustrates a sectional view of the impeller of FIG. 1 at the end of the manufacturing process, after a step of hot isostatic pressing.

FIG. 5 illustrates a sectional view, similar to the sectional view of FIG. 4 of the final impeller.

The metal powder subject to hot isostatic pressing generates a volume of solid metal which improves the adhesion between the different impeller segments 1S, so that bonding between the various impeller segments is enhanced. A body of the high mechanical resistance is thus obtained.

In some embodiments, the metal powder used for manufacturing the single impeller segments 1S can be the same as the metal powder used for filling the inner cavities of the semi-finished impeller. However, the mixed method of manufacturing disclosed herein, which combines additive manufacturing and hipping, can be used in combination with different metal powder materials for the two manufacturing phases. A first metal powder can be used for the additive manufacturing step and a second, different metal powder can be used for filling the inner cavities and subsequent hipping. Selection of the most appropriate chemical and physical properties of the material becomes thus possible. In some embodiments, a finer metal powder can be used for additive manufacturing of the skin portions of the impeller segments 1S, and coarser metal powder can be used for cavity filling and hipping. In some embodiments the average grain size of the metal powder for the skin portion is between 10 and 48 micrometers, while an average grain size of 50-100 micrometers can be used for the core portions of the impeller, i.e. for filling the inner cavities and hipping.

Additional advantages of the dual-step manufacturing method derive from the option of selecting materials having different chemical properties for the skin and the core of the impeller. Depending upon the final use of the impeller, different materials can be used to achieve the best compromise, e.g. between mechanical and/or chemical resistance and weight. The following table summarizes possible different metal alloys, which can be used respectively for the skin (outer portion manufactured by additive manufacturing) and for the core (inner cavities powder-filled and hipped) of the impeller, and the advantages achieved by the respective combinations:

| Skin material | Core material | Technical result |
| --- | --- | --- |
| Ni base super-alloy (e.g. In625, IN718, IN625M, A286, IN706, . . . ) or Ti alloys (e.g. Ti64, Ti17, Ti6246 . . . ) | Ni base super-alloy (e.g. In625, IN625M) or Ti alloys (Ti64, Ti17, Ti6246 . . . ) | Protect from corrosion in oil and gas environment |
| Ni base super-alloy (e.g. In625, IN718, IN625M, A286, IN706, . . . ) or Ti alloys (e.g. Ti64, Ti17 Ti6246 . . . ) | Steels (e.g. 15-5PH, 17-4PH, carbon steel, AISI410, AISI 403 . . . ) | Protect surfaces exposed fluids from corrosion in oil and gas environment Use cheaper powder for core |
| Ni base super-alloy (e.g. In625, IN718, IN625M, A286, IN706, . . . ) or Ti alloys (e.g. Ti64, Ti17, Ti6246 . . . ) | Ti alloys (e.g. Ti64, Ti17, Ti6246 . . . ) or aluminum alloys (e.g. Al 2014, Al 7075 . . . ) | Reduce component weight and increase component speed |
| Steels (e.g. 15-5PH, 17-4PH, . . . ) | Ti alloys (e.g. Ti64, Ti17, Ti6246 . . . ) or alumunium alloys (e.g. Al 2014, Al 7075 . . . ) | Reduce component weight and increase component speed Use cheaper powder for skin |

Each single material listed in a group of the first column can be combined with any one of the materials of the corresponding group of the second column.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. Different features, structures and instrumentalities of the various embodiments can be differently combined.

The invention claimed is:

1. A turbomachine impeller comprising: a disc; a hub defining a central aperture and a first cavity; and a shroud forming an impeller eye and defining a second cavity; the hub, disc, and shroud collectively formed by a plurality of individual impeller members adjacently adjoined together and defining a respective interface between adjoining members, each individual impeller member comprising a respective disc portion forming part of the disc, a respective hub portion forming part of the hub, a respective shroud portion forming part of the shroud, and a respective blade portion extending from a front portion of the disc portion to the shroud portion, wherein the hub portion of each individual impeller member defines a respective cavity forming a segment of the first cavity and the shroud portion of each individual impeller member defines a respective cavity forming a segment of the second cavity; and the first cavity and the second cavity are each completely surrounded by a non-removable skin formed from a first metal powder material, and the first cavity and the second cavity are filled with a second metal powder material, the first metal powder material and the second metal powder material have different chemical compositions.

2. The turbomachine impeller of claim 1, wherein the first metal powder material has an average grain size smaller than an average grain size of the second metal powder material.

3. The turbomachine impeller of claim 2, wherein the average grain size of the first metal powder material is between 10 and 48 micrometers and the average grain size of the second metal powder material has between 50 and 100 micrometers.

4. The turbomachine impeller of claim 1, further comprising an inlet surrounded by the impeller eye and an outlet, wherein each individual impeller member defines a respective leading edge at the impeller inlet and a trailing edge at the impeller outlet.

* * * * *